Patented Oct. 6, 1925.

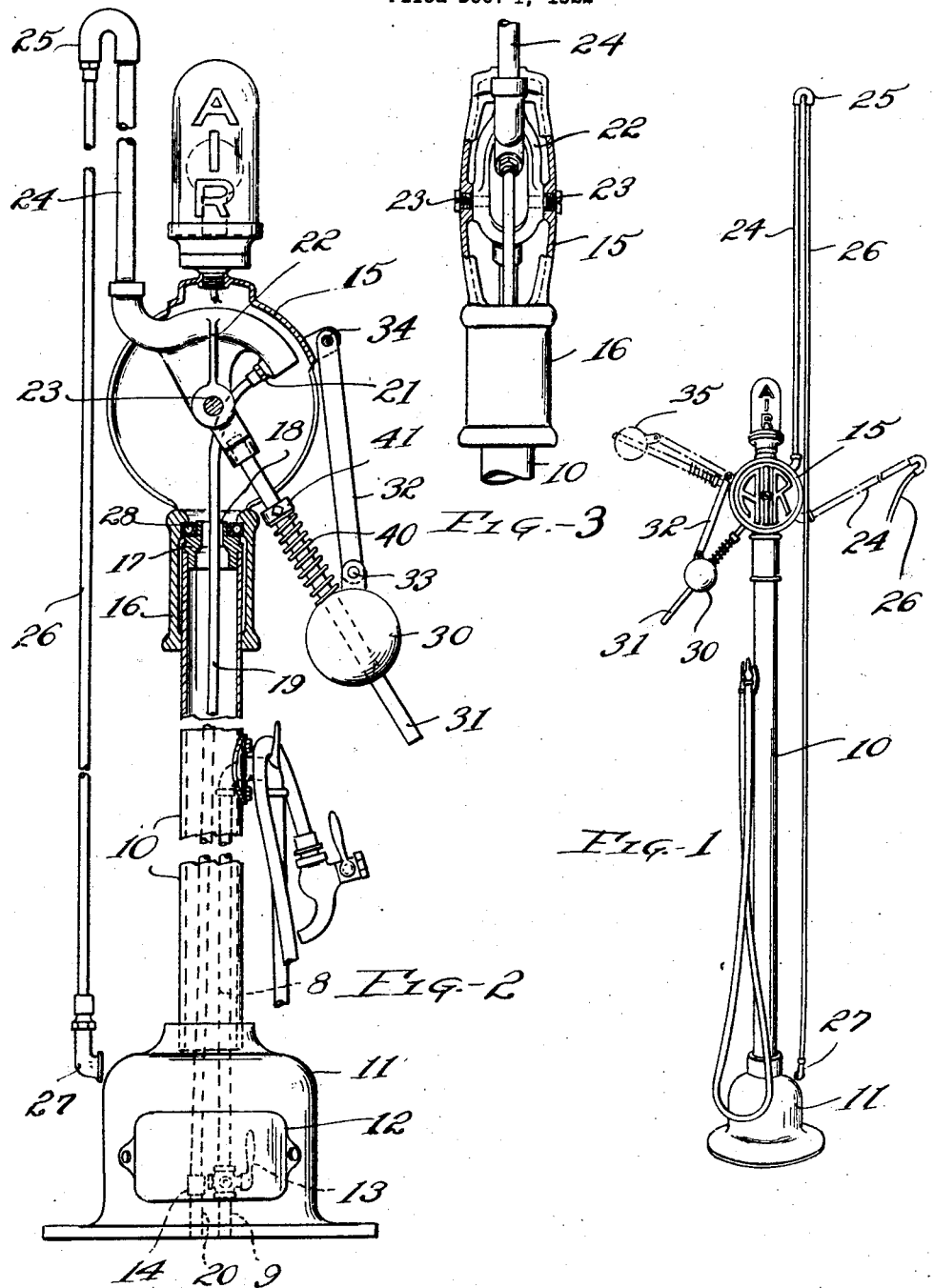

1,556,397

UNITED STATES PATENT OFFICE.

ROLLIN L. BACHER, OF CLEVELAND HEIGHTS, OHIO, ASSIGNOR TO THE UNITED STATES AIR COMPRESSOR CO., OF CLEVELAND, OHIO, A CORPORATION OF OHIO.

AIR-SUPPLY TOWER.

Application filed December 1, 1922. Serial No. 604,189.

*To all whom it may concern:*

Be it known that I, ROLLIN L. BACHER, a citizen of the United States, residing at Cleveland Heights, in the county of Cuyahoga and State of Ohio, have invented a certain new and useful Improvement in Air-Supply Towers, of which the following is a full, clear, and exact description, reference being had to the accompanying drawings.

This invention relates to means for inflating the tires of motor vehicles, bicycles, etc., and more particularly to means in a device wherein the air hose is suspended normally above the roadway, but is downwardly movable so as to be readily accessible for use.

Usually a device of this character, embodies an arm carrying an air hose and having a counterweight rigidly attached to the arm, and usually the arm is limited in its revolving movement. Accordingly, whenever the hose is pulled downwardly the counterweight decreases in effectiveness when the arm reaches a certain position. In instances wherein the revolving movement of the arm and hose is prevented, the radius of action is of course restricted so that the tires of motor vehicles on only one side of the air stations may be inflated satisfactorily.

One of the objects of my invention therefore, is the provision of means for increasing the effectiveness of the counter-weight proportionately to the lowering of the hose supporting arm. My invention moreover contemplates the use of a counterweight having these characteristics together with such an arrangement of hose connection as will permit the effective operation without interfering with the revolving movement of the hose relatively to the hose support.

I carry out the above objects by providing an extension of the hose supporting arm on the opposite side of the fulcrum therefor, and on this extension I provide a counterweight which is free to move relatively thereof, and I employ suitable means for moving the counterweight away from the fulcrum as the hose supporting arm is lowered. For permitting the arm to be revolved about the support therefor, I employ a flexible conduit or hose within a standard, which hose has one end connected to a stationary supply line near the base of the standard and the other end to a conduit formed by the hose supporting arm. By making the connection with the stationary supply line adjacent the base of the standard, then that part of the hose within the standard comprises a torsion member which permits the air hose arm to be revolved at least a full turn and when released causes the arm to resume substantially its original position.

The means for carrying out my invention will be more fully set forth in the following description which pertains to the accompanying drawings and the essential features will be summarized in the claims.

In the drawings, Fig. 1 is an elevation of an air station embodying features of my invention; Fig. 2 is a similar view partially in section, on an enlarged scale; Fig. 3 is an enlarged side elevation of the casing adjacent the point of pivotal connection for the hose supporting arm.

In the drawings, 10 designates a hollow standard, mounted on a hollow base 11, which may be provided with a door 12. This door permits access to water and air connections 13 and 14. The upper end of the standard carries a hollow head or casing 15 which may be provided with a neck 16 extending over the standard and swivelly mounted thereon. The swivel connection preferably comprises a sleeve 17 which extends into the standard and carries a self contained ball bearing 28, and which is provided with an opening 18 through which an air conduit or hose 19 may extend. The conduit 19 is connected at one end to a stationary conduit 20 and at the other end, as at 21, to a member 22 which is pivotally mounted at 23 on the head 15. The member 22 has an air passageway therein which communicates with a hose supporting arm 24. This arm comprises a pipe, the upper end of which is attached to a return bend connection 25 from which a flexible air hose 26 extends. The air hose is provided with a connection 27 for application to the usual tire valve.

The air hose arm 24 is normally held in raised position by means of a counterweight 30 which as shown, is carried on an extension 31. This extension or arm may form part of the member 22 extending on the side of the fulcrum 23 opposite to that of the arm 24 as shown particularly in Fig. 2. The counterweight is slidably mounted on the arm 31 and is positioned by means of a link 32, one end of which is attached to the counterweight at 33 and the other end of which may be pivoted at 34 to the head 15.

Then as the air hose is lowered, with a consequent raising of the counterweight arm 31, the counterweight is moved outwardly from the fulcrum 23 as shown in the broken lines 35 on Fig. 1. Accordingly, the counterweight acts in the counterweight arm at increasing distances from the fulcrum as the air hose is lowered, the result being that more power is available for returning the hose to upright position than would be available if the counterweight were permanently attached to the associated arm.

To prevent the counterweight from striking the standard or any part of the casing, I have shown a cushioning member as embodied in a coil spring 40 which is placed over the arm 31 and is attached at one end to an adjustable collar 41. This spring is so positioned, that as the counterweight descends, an engagement with the upper end of the spring is effected before any part of the member 22 or arm 31 strikes the casing. Then since the path of the counterweight is governed by the link 32, it follows that continued downward movement of the weight compresses the spring 40 and cushions the blow resulting from the falling counterweight, without permitting contact of the arm with any part of the mechanism pivotally mounted on the casing.

It is frequently desirable to so position a device of this character, that tires of motor vehicles may be inflated on either side of the device. Accordingly, the casing is rotatably mounted on the standard by means of the neck 16 which loosely embraces the top of the standard and is supported on the bearing 28. By making the air conduit 19 of rubber hose, the conduit itself serves as a torsion member which may be of sufficient length to permit more than a complete turn. After the air hose has been used and has been released, the conduit 19 untwists and returns the hose to the original position relative to the standard. To facilitate the action of the hose 19, the member 22 is provided with separated arms between which the hose extends as shown particularly in Fig. 3. This prevents contact of the hose with the pivot pins 23 when the arm 24 is revolved, wherefore the hose may be readily twisted when the arm is in lowered position.

The construction heretofore described facilitates the assembling and the installation of an air station at any desired place remote from a gas station. For example, water and air pipes as at 9 and 20 respectively may be carried in the ground and then extended upwardly above the ground so as to be accessible through the door of the base 11. Then the base and standard are placed over the air and water conduits and the casing 15 together with the associated hose carrying arm is placed over the standard with the hose 19 extending through the standard. Since the air hose 26 is provided with a valve 27, then the hose 19 may be connected with the pipe 20 by a suitable union 14, while the water line 8 may be suitably connected as by a valve 13 to the pipe line 9. In this way, the various operating parts of the station may be assembled in the factory and quickly positioned for use in the desired location.

In view of the foregoing description, it will be seen that my invention provides means for proportionately increasing the force tending to return the air hose to normal raised position, in accordance with the degree to which the hose is lowered, and that the means employed may be readily adapted to existing air supply stations without necessitating extensive changes in the construction thereof. Moreover, my invention permits the air hose to be revolved on the standard for serving motor vehicles on either side thereof, without endangering any of the air connections, whereby the air supply station may have an increased range of usefulness over those wherein the angular movement of the air hose is restricted.

Having thus described my invention, I claim:—

1. A device of the character described comprising in combination a support, an arm mounted on the support and adapted to be moved relatively thereto, a flexible hose depending from the arm and having at its lower end a connection for a tire valve, a counterweight tending to raise the arm, and means for increasing the distance between the counterweight and the pivot of the arm when the arm is lowered.

2. A device of the character described comprising in combination, a support, an arm pivotally mounted on the support, a flexible hose depending from the arm and having at its lower end a connection for a tire valve, a counterweight slidable on the arm and functioning to maintain the arm normally in upright position and means whereby the leverage between the counterweight and the pivotal connection is increased when the arm is lowered.

3. A device of the character described comprising in combination, a support, a fluid-carrying arm mounted on the support and adapted to be moved relatively thereto, a counterweight tending to hold the arm in upright position, and means for moving the counterweight relatively to the arm whenever the arm is lowered, said means being so arranged that the tendency for the weight to raise the arm is increased when the arm is lowered.

4. A device of the character described, comprising in combination, a support, a fluid-carrying arm pivotally mounted on the support, a counterweight slidable on the arm and functioning to maintain the arm normally in upright position and means operatively connecting the counterweight with the support, whereby the leverage between the counterweight and the pivotal connection is increased when the arm is lowered.

5. A device of the character described comprising in combination, a support, a fluid-carrying arm pivotally mounted thereon, a counterweight slidably mounted on the arm, and a link connecting the support and counterweight in such manner that the weight is moved away from the pivot as the arm is lowered, whereby the force tending to raise the arm is increased proportionately as the arm is lowered.

6. In an air supply station for motor vehicles, the combination with a flexible air hose, of a supporting arm therefor, means for pivotally mounting said arm to permit movement thereof in a vertical plane, said arm having an extension on the opposite side of said pivotal connection, a counter-weight movable on the extension, and means for moving the counterweight on said extension away from the pivotal connection as the arm is lowered.

7. An air supply station for motor vehicles comprising in combination, a flexible air hose, a supporting arm therefor, means for pivotally mounting the arm to swing in a vertical plane, a counterweight associated with the arm for returning it to normal position, and means associated with the counterweight for moving it progressively away from the pivotal connection as the air hose in lowered.

8. An air supply station comprising in combination a flexible air hose, an arm comprising an air conduit, one end of which is connected to the hose, a support, means for pivotally mounting the arm on the support, an extension associated with the arm, a counterweight movable relatively to the extension, and cushioning means on the extension for preventing contact between the arm and support when the counterweight acts to return the hose to normal position.

9. An air supply station of the character described comprising in combination a flexible air hose, an arm connected to one end of the hose, a casing to which the arm is pivotally connected, a counterweight associated with the arm, means carried by the casing for moving the counterweight relatively to the arm as the hose is lowered, whereby the force tending to return the hose to normal position is increased proportionately to the amount of lowering, and cushioning means on the arm for engaging the counterweight whereby contact between the arm and casing is prevented when the hose is returned to normal position.

10. An air supply station comprising in combination, a support, an arm pivotally mounted on the support, said arm having an extension on the side of the pivotal connection opposite the arm, a counterweight movable on the extension, and a helical spring surrounding the extension and serving as cushioning means for the counterweight to prevent contact of the arm with the support.

11. An air supply station for motor vehicles comprising in combination, a hollow standard having an opening adjacent the upper end, a casing rotatably mounted on the standard, a tubular arm pivoted within the casing, a rod extending from the arm on the opposite side of its pivot obliquely to the general direction of the arm, whereby when the arm is upright, the rod extends diagonally down at the side of the standard, a counterweight slidably mounted on the arm, a link connecting the counterweight with the casing, and a flexible hose secured at its upper end to the free end of the arm and having at its lower end a head for air connection with the tire valve.

In testimony whereof, I hereunto affix my signature.

ROLLIN L. BACHER.